UNITED STATES PATENT OFFICE.

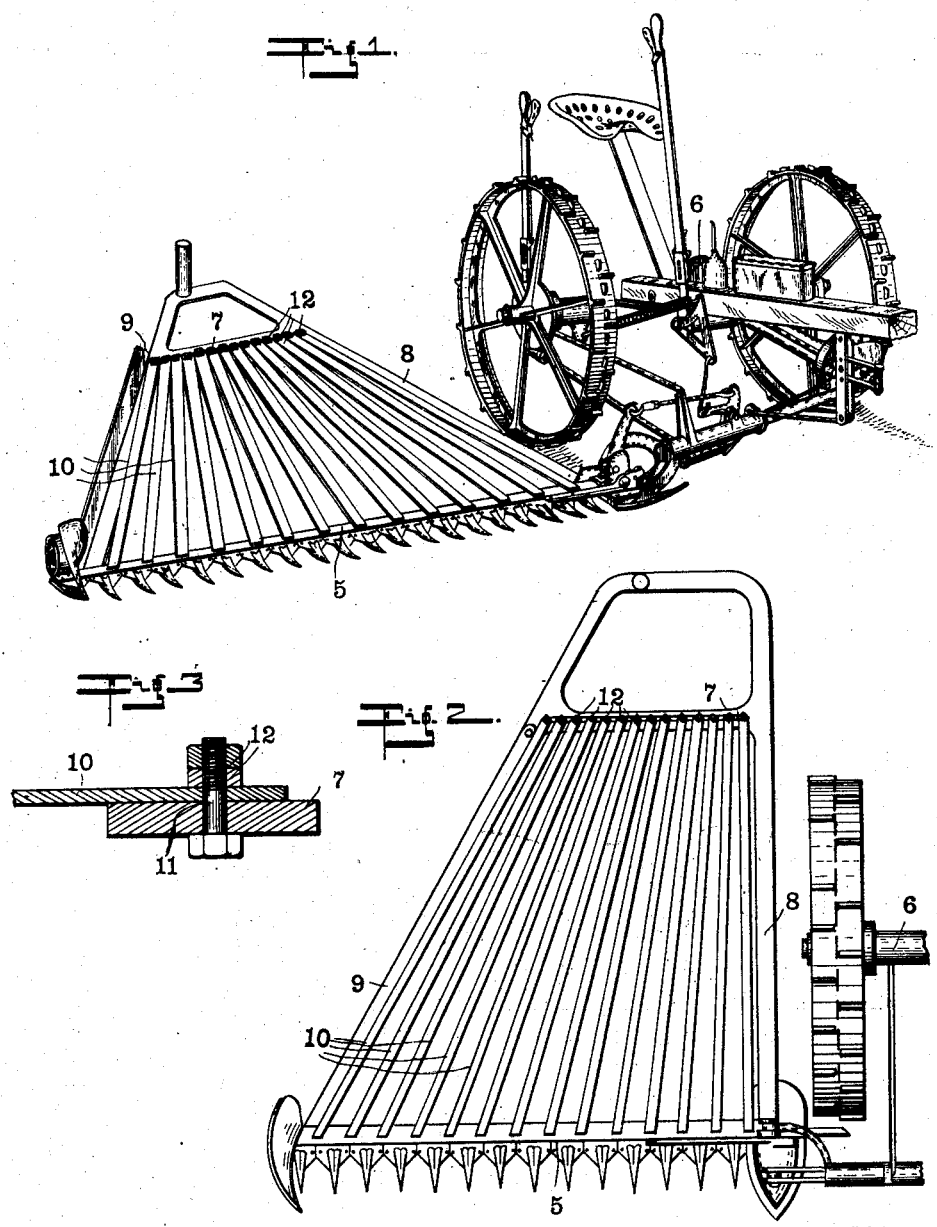

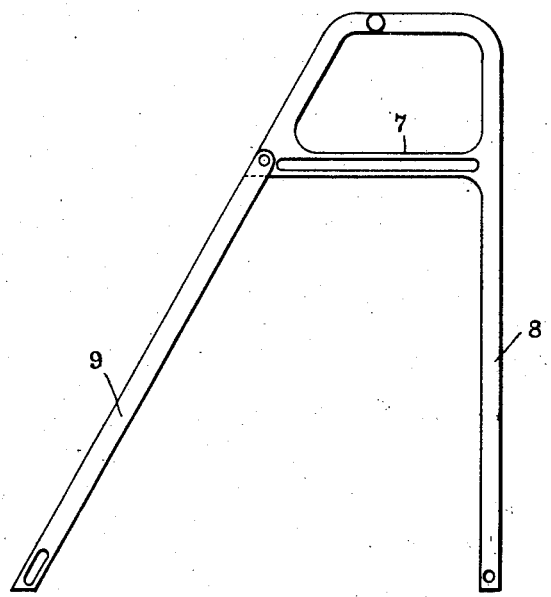

JOSEPH K. SHARPE, JR., OF INDIANAPOLIS, INDIANA.

BOTTOM FOR CLOVER-BUNCHERS.

No. 901,491.     Specification of Letters Patent.     Patented Oct. 20, 1908.

Application filed March 17, 1902. Serial No. 98,553.

*To all whom it may concern:*

Be it known that I, JOSEPH K. SHARPE, Jr., a citizen of the United States, residing at Indianapolis, in the county of Marion and State of Indiana, have invented certain new and useful Improvements in Bottoms for Clover-Bunchers, of which the following is a specification.

My invention relates to an improvement in that class of machines designed for attachment to mowing machines used for cutting and bunching low seed crops, such as clover, alfalfa, etc.

In bunching attachments now on the market, it has been customary to provide a slatted bottom to receive the cut crop and a separate and distinct size has been made for each usual length of cutter bar, the attachment as a whole being manufactured separately from mowing machines and being adapted to be attached to the commercial and different makes thereof.

The object of my present invention is to provide a slatted bottom, forming part of a buncher attachment, of such construction that the same may be made in a standard size and attached to cutter-bars of variable lengths.

The accompanying drawings illustrate my invention.

Figure 1 is a perspective view of a mowing machine provided with my improved buncher bottom; Fig. 2 is a plan thereof; Fig. 3 is a detail; Fig. 4 is a detail plan of the bottom frame with the fingers omitted.

In the drawings, 5 indicates the usual cutter bar of a mowing machine 6. My attachments consist of a bar 7 which should preferably be supported substantially parallel with the cutter bar 5 and for this reason I make the side bar 8 integral with the cross bar 7, the said side bar being adapted to be attached at its forward end to the heel of the cutter bar. Pivoted to the outer end of bar 7 is a second side bar 9 which is adapted to be attached at its forward end to the toe of the cutter 5. Pivoted to bar 7 upon substantially vertical axes is a plurality of slats 10 which extend forward from bar 7 and are adapted to rest upon the rear edge of the cutter bar 5. Any suitable means may be used to hold the slats evenly spaced, as, for instance, bolts 11 each of which passes through a perforation in the bar 7 and into a threaded opening in the slat, the bolt being held by a suitable check nut 12.

It will be readily understood that side bar 8 may be movably attached to bar 7 that the side bars may be pointed in any manner to allow the forward ends to be moved toward or from each other, so as to allow connection to cutter bars of different lengths, without departing from my invention.

I claim as my invention:—

1. A buncher bottom consisting of a frame having its side arms relatively movable with forward ends thereof adapted to be attached to the cutter bar of a mower, and a plurality of slats extending forward from the rear portion of the frame and secured to said rear portion by means permitting the lateral adjustment of the free forward ends of the slats.

2. A buncher bottom consisting of a rear bar 7, a pair of side arms extending forward from said bar 7 and one of said arms being pivotally connected to said bar, and a plurality of slats pivotally connected at their rear ends to the said bar upon substantially vertical pivots and extending forward in the same general direction as the side arms, the said side arms being adapted at their forward ends to be connected to the cutter bar of a mower.

3. A buncher bottom consisting of a frame having relatively movable sides adapted to be attached to the cutter bar of a mower, and a plurality of slats carried by the frame, each upon a substantially vertical pivotal connection at its rear end and extending forward in the same general direction as the relatively movable sides.

In witness whereof, I, have hereunto set my hand and seal at Indianapolis, Indiana, this 7th day of March, A. D. one thousand nine hundred and two.

JOSEPH K. SHARPE, JR. [L. S.]

Witnesses:
     ARTHUR M. HOOD,
     JAMES NELLER.